(12) United States Patent
Johnson

(10) Patent No.: US 12,487,010 B2
(45) Date of Patent: Dec. 2, 2025

(54) GEOTHERMAL HEAT EXTRACTOR

(71) Applicant: JTEC ENERGY, INC., Atlanta, GA (US)

(72) Inventor: Lonnie G. Johnson, Atlanta, GA (US)

(73) Assignee: JTEC ENERGY, INC., Atlanta, GA (US)

( * ) Notice: Subject to any disclaimer, the term of this patent is extended or adjusted under 35 U.S.C. 154(b) by 272 days.

(21) Appl. No.: 18/083,087

(22) Filed: Dec. 16, 2022

(65) Prior Publication Data

US 2023/0194127 A1 Jun. 22, 2023

Related U.S. Application Data

(60) Provisional application No. 63/292,055, filed on Dec. 21, 2021.

(51) Int. Cl.
*F24T 10/00* (2018.01)
*F24T 50/00* (2018.01)

(52) U.S. Cl.
CPC .............. *F24T 10/00* (2018.05); *F24T 50/00* (2018.05); *F24T 2010/56* (2018.05)

(58) Field of Classification Search
CPC ....... F24T 1010/56; F24T 50/00; F24T 10/00; F24T 10/17
See application file for complete search history.

(56) References Cited

U.S. PATENT DOCUMENTS

| | | | | |
|---|---|---|---|---|
| 5,208,112 A | * | 5/1993 | Ludwig | H01M 8/182 |
| | | | | 429/472 |
| 11,480,160 B1 | * | 10/2022 | Mokheimer | F03G 4/001 |
| 2013/0333383 A1 | * | 12/2013 | Schwarck | F24T 10/10 |
| | | | | 165/45 |
| 2020/0011573 A1 | * | 1/2020 | Graham | F24T 10/17 |

OTHER PUBLICATIONS

Hirschenhofer et al., Fuel Cell Handbook, 4th Edition, p. 2-5 (1999).

* cited by examiner

*Primary Examiner* — Devon Lane
(74) *Attorney, Agent, or Firm* — Panitch Schwarze Belisario & Nadel LLP

(57) ABSTRACT

A geothermal heat extractor includes a heat transfer fluid and a heat transfer fluid supply conduit. The heat transfer fluid is maintained in the supply conduit in a liquid state at a pressure above its saturation pressure. The geothermal heat extractor further includes a heat transfer fluid return conduit, a geothermal heat source coupled thereto, at least one flow control valve configured to control the flow of the heat transfer fluid from the supply conduit to the return conduit, and an external load coupled to the return conduit. As the heat transfer fluid is provided to the return conduit in the liquid state, the heat transfer fluid vaporizes in the return conduit by heat supplied to the return conduit from the geothermal heat source. The vaporized heat transfer fluid is supplied from the return conduit to the external load.

11 Claims, 6 Drawing Sheets

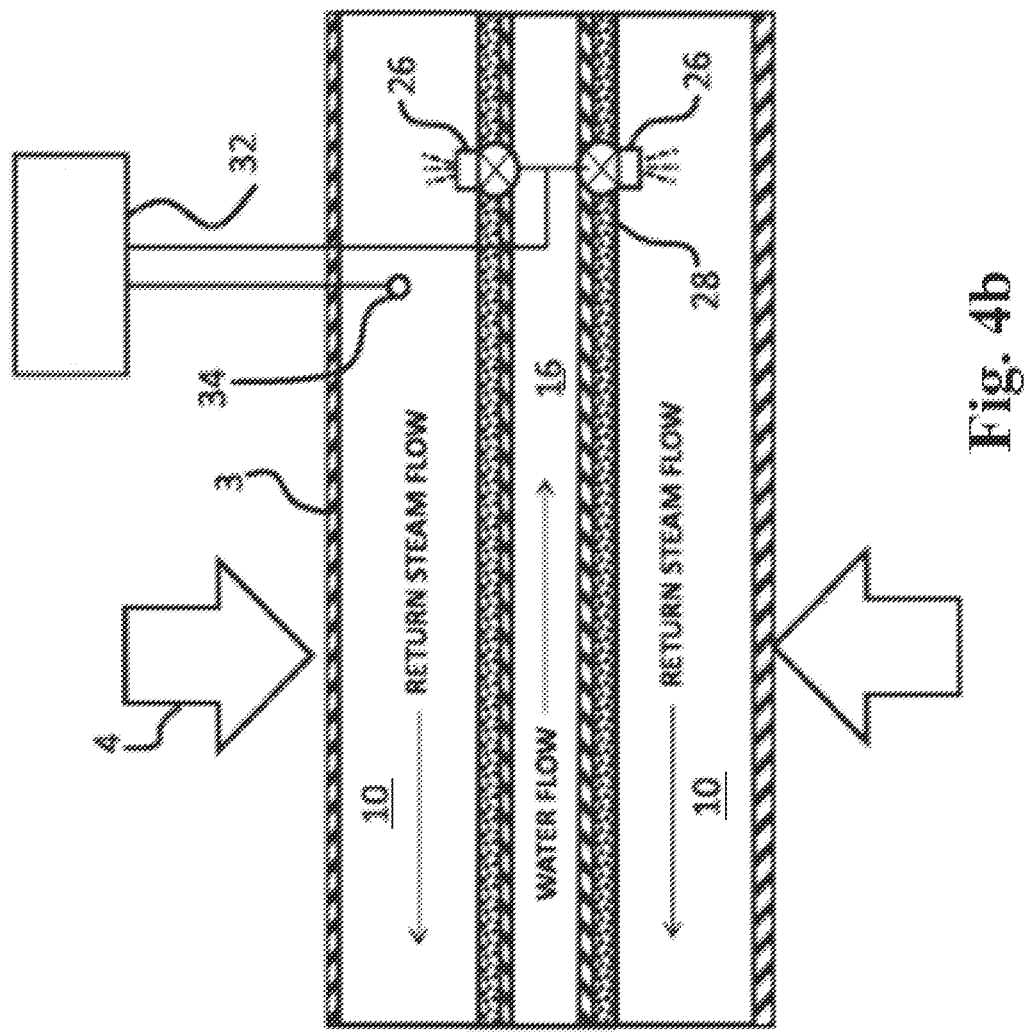
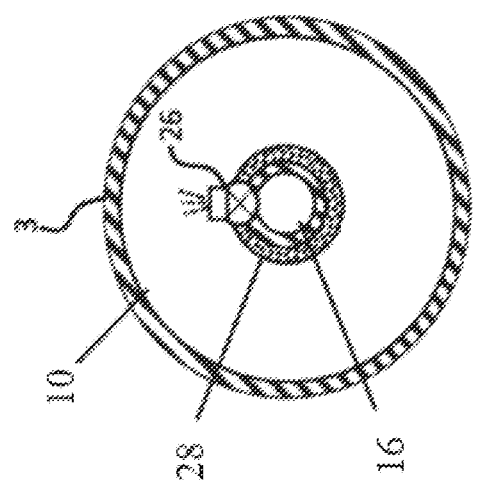
Fig. 4b
Fig. 4a

GEOTHERMAL HEAT EXTRACTOR

CROSS-REFERENCE TO RELATED APPLICATIONS

This application claims priority to U.S. Provisional Patent Application No. 63/292,055, filed Dec. 21, 2021, the entire disclosure of which is herein incorporated by reference.

BACKGROUND OF THE INVENTION

Geothermal energy is of growing interest due to its potential for reducing emissions and the consumption of non-renewable resources. Geothermal energy sources, such as abandoned oil wells, provide a readily available source of heat that does not have the limitation of requiring a battery for energy storage, as do wind and solar photovoltaic systems. Geothermal energy is continuous and does not require battery storage.

The heat load to which a geothermal system supplies heat may be for residential and/or commercial/industrial heating and/or for power generation. Water flow loops are a very common and popular method for heat extraction. Closed loop liquid systems may be gravity driven, wherein the difference in density between heated liquid verses unheated liquid creates buoyancy that promotes circulation. In such cases, the resulting flow rate and thus heat extraction may be enhanced by use of a pump. However, a major drawback of water flow loops is the limited amount of heat extracted per unit mass flow and the sliding temperature over which heat transfer takes place.

Power generation from geothermal energy resources is usually accomplished through the use of a conventional steam turbine or a binary plant. Conventional steam turbines require fluids in excess of 150° C. This hot, highly pressurized fluid (e.g., water) is "flashed" to produce steam which drives the turbines to generate electricity. However, the thermodynamic properties of water restrict the use of this type of generator to high-temperature geothermal resources.

Medium-temperature and low-temperature geothermal heat sources are of interest because of their broad availability. Historically, the challenge with such heat sources has been the difficulty of meeting cost/economical requirements for practical systems. For example, water drawn from low-temperature geothermal sources may not contain adequate energy to flash enough steam at pressures sufficient to drive turbines. Thus, such systems require large amounts of pump power to generate the level of high water flow rates needed to extract sufficient heat to meet operating requirements. However, the heat energy held within the water is transferred to the secondary fluid (thermal oil or silicone-based oil), which has a much lower boiling point. The secondary fluid is "flashed" to produce sufficient vapor and pressure to drive the turbine. This process, generally termed the Organic Rankine Cycle (ORC), enables power production from fluids with a temperature as low as 75° C.

However, the amount of heat carried from the source to the converter at a given mass flow rate is limited by the water's specific heat. In addition to being inhibited by the need for large amounts of pump power, a sliding slope temperature change occurs as the water absorbs and releases heat. The system efficiency is less than optimum because the temperature of the heat coupled to the converter can be significantly lower than the geothermal heat source temperature, since the heat transfer water cools as heat is transferred to the converter. Thus, a balance must be struck between the flow rate (pump power consumption) and temperature change of the water used to couple geothermal heat from the source to the converter.

Heat extraction can be enhanced using buoyancy driven water flow. Heat transport can be improved by using special working fluids that evaporate at geothermal heat source temperatures, at pressure levels that are sufficient to cause the return flow to the surface to be in vapor form. The heat transfer rate is enhanced by the phase change of the working fluid. However, these fluids are organic liquids or other materials that are expensive and not practical for use in most heat extraction situations.

Thus, it would be desirable to provide an improved method and system for efficiently and practically extracting heat from geothermal sources.

BRIEF SUMMARY OF THE INVENTION

Briefly stated, one embodiment comprises a geothermal heat extractor including a heat transfer fluid and a heat transfer fluid supply conduit. The heat transfer fluid is maintained in the heat transfer fluid supply conduit in a liquid state at a pressure above its saturation pressure. The geothermal heat extractor further includes a heat transfer fluid return conduit, a geothermal heat source coupled to the heat transfer fluid return conduit, at least one flow control valve configured to control the flow of the heat transfer fluid from the heat transfer fluid supply conduit to the heat transfer fluid return conduit, and an external load coupled to the heat transfer fluid return conduit. As the heat transfer fluid is provided to the heat transfer fluid return conduit in the liquid state, the heat transfer fluid vaporizes in the heat transfer fluid return conduit by heat supplied to the heat transfer fluid return conduit from the geothermal heat source. The vaporized heat transfer fluid is supplied from the heat transfer fluid return conduit to the external load.

In one aspect, the heat transfer fluid is water.

In another aspect, the external load is a heat load, and the vaporized heat transfer fluid supplied to the heat load is condensed back to the liquid state, thereby releasing its latent heat of condensation.

In another aspect, a liquid phase heat transfer fluid pump is coupled to the heat transfer fluid supply conduit and configured to supply the heat transfer fluid to the at least one flow control valve at a pressure above the vapor pressure of the heat transfer fluid at a temperature of the heat source.

In another aspect, at least one sensor monitors a content of the heat transfer fluid return conduit, and a controller is coupled to the at least one sensor and the at least one flow control valve. The controller is configured to actuate the at least one flow control valve to regulate flow of the heat transfer fluid in the liquid state into the heat transfer fluid return conduit at a predetermined rate, such that the heat transfer fluid in the liquid state is vaporized in the heat transfer fluid return conduit by the heat conducted from the geothermal heat source and such that accumulation of liquid within the heat transfer fluid return conduit is prevented.

In another aspect, the external load is a power generating load. In yet another aspect, the power generating load is an electrochemical heat to electric converter. In still another aspect the electrochemical heat to electric converter includes a hydrogen chamber, a working fluid chamber coupled to the heat transfer fluid return conduit and configured to receive the vaporized heat transfer fluid from the heat transfer fluid return conduit, the vaporized heat transfer fluid being a working fluid which flows through the working fluid chamber, a condensation chamber coupled to the hydrogen chamber to supply hydrogen to the hydrogen chamber and coupled to the working fluid chamber to receive working fluid from the working fluid chamber, and a plurality of membrane electrode assemblies. Each membrane electrode assembly includes an anode, a cathode and a proton conductive membrane sandwiched between the anode and cathode. The anodes of the membrane electrode assemblies are positioned in the hydrogen chamber and are exposed to a flow of hydrogen provided from the condensation chamber. The cathodes of the membrane electrode assemblies are positioned in the working fluid chamber and are exposed to the working fluid flowing in the working fluid chamber.

In another aspect, the membrane electrode assemblies are electrically connected in series.

In another aspect, the vaporized heat transfer fluid condenses in the condensation chamber under isothermal or nearly isothermal conditions.

In another aspect, the working fluid passes across the cathodes of the membrane electrode assemblies sequentially. The working fluid releasing its latent heat of vaporization incrementally and sequentially to each membrane electrode assembly, thereby generating power while approximating constant or nearly constant temperature condensation of the working fluid.

BRIEF DESCRIPTION OF THE DRAWINGS

The following detailed description of preferred embodiments of the present invention will be better understood when read in conjunction with the appended drawing. For the purposes of illustrating the invention, there is shown in the drawing an embodiment which is presently preferred. It is understood, however, that the invention is not limited to the precise arrangements and instrumentalities shown. In the drawings:

FIG. 4a is a top, cross-sectional view of a geothermal heat extraction system in accordance with an embodiment of the invention, wherein the system has a concentric tube heat extractor and utilizes distributed flash flow control valves;

FIG. 4b is a side, cross-sectional view of the geothermal heat extraction system shown in FIG. 4a;

DETAILED DESCRIPTION OF THE INVENTION

In one aspect, the present invention relates to a geothermal system that operates based on a low to moderate temperature heat source, and has improved efficiency and cost effectiveness as compared with conventional geothermal systems. The extractor of the present invention flash evaporates the heat transfer fluid, preferably water, at the heat source. The heats of vaporization of water and other liquids are generally significantly larger than a given fluid's specific heat. As such, the process enables greater amounts of heat to be extracted at a given mass flow rate. The resulting vapor is supplied to a heat load where it is condensed to release its latent heat without a significant loss of temperature (i.e., isothermally or near isothermally), such that the temperature at which the steam releases its latent heat is the same or almost the same as the temperature of the geothermal heat source. Also, transport of the steam from the geothermal source can occur with very limited loss of pressure.

Figure 1:
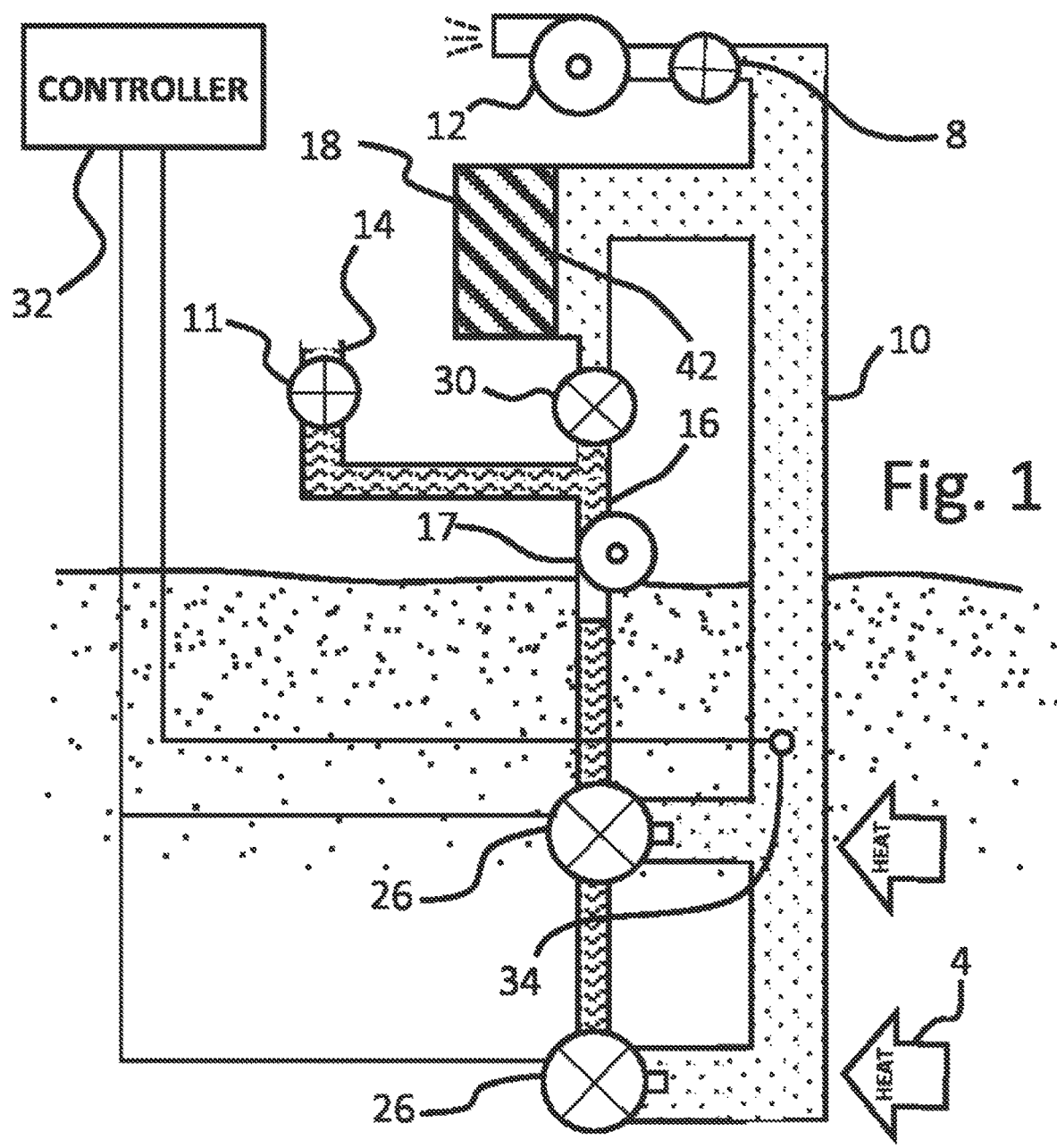
FIG. 1 is a schematic of a geothermal heat extraction system in accordance with an embodiment of the invention, while in a pre-operative mode.
Figure 2:
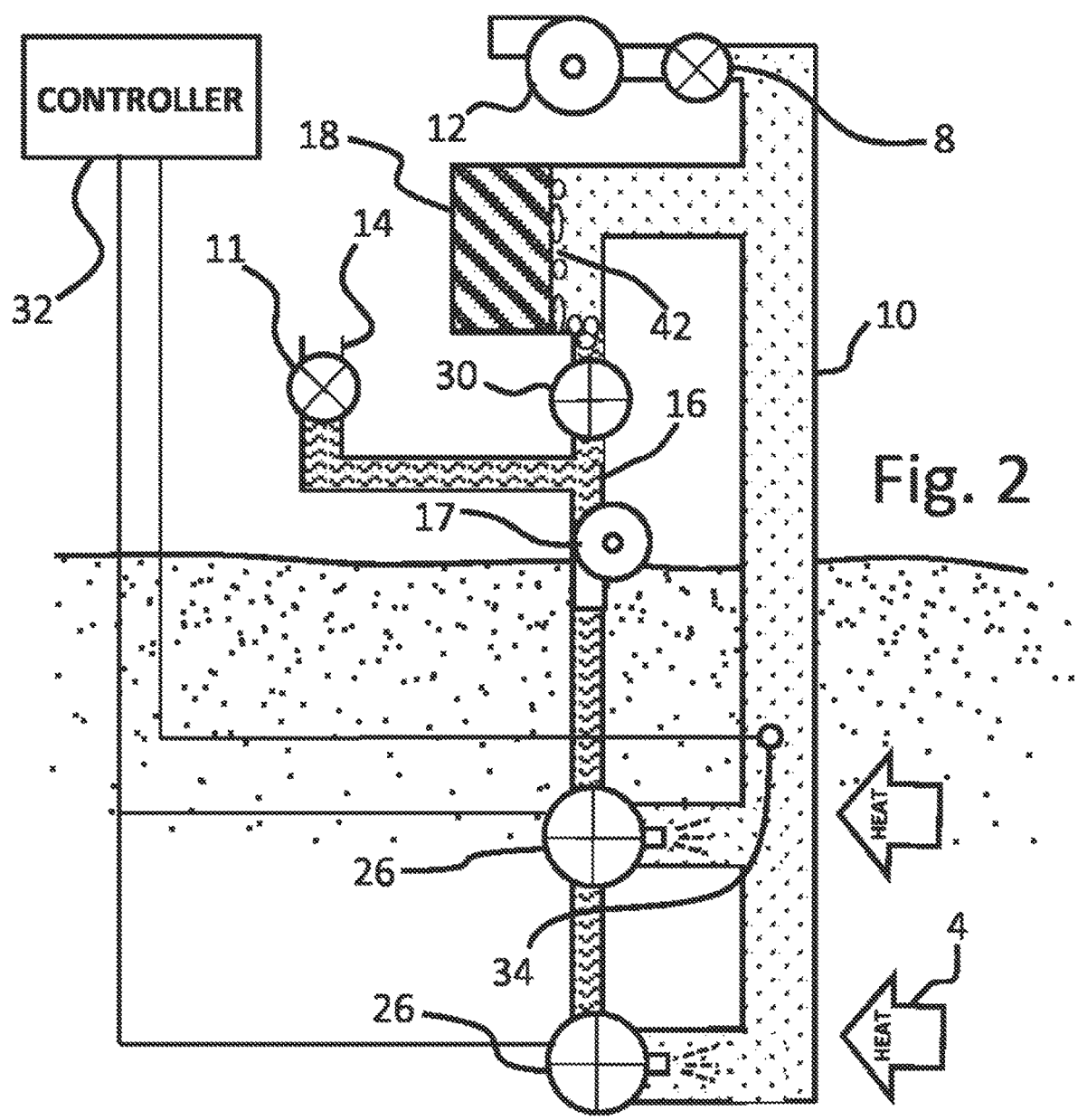
FIG. 2 is a schematic of the geothermal heat extraction system shown in FIG. 1, while in an operational mode supply heat to a thermal load.

Referring to FIGS. 1-2, in one embodiment, the geothermal heat extractor of the present invention comprises a heat source 4, a heat transfer fluid supply conduit 16, a heat transfer fluid return conduit 10, and one or more flow control valves. The conduits 10, 16 may be made from standard steel oil well bore piping, although other like materials may be used. The heat transfer return conduit is optionally insulated to avoid cooling and condensation of the steam by surrounding earth as it comes up the pipe. The heat transfer fluid supply conduit 16 and the heat transfer fluid return conduit 10 preferably extend in a single or separate bores or boreholes formed in and through a ground surface. Thus, a portion of each of the supply conduit 16 and the return conduit 10 is preferably located below the ground surface and another portion of each conduit 16, 10 is located above the ground surface. The bore(s) may extend in a vertical direction, a horizontal direction, or a combination of vertical and horizontal directions.

In one embodiment, each bore is an abandoned well bore, and preferably an abandoned oil well bore. However, it will be understood by those skilled in the art that the present invention is in no way limited to abandoned well bores. The bores may be abandoned bores of other types, or may be proactively formed proximate a geothermal heat source, such as a hot spring or the like, specifically for purposes of building the heat extraction system of the present invention.

The heat source 4 is preferably a geothermal heat source, such as a hot spring or the like. The heat source 4 is preferably coupled to the return conduit 10, so as to be configured to provide heat to the return conduit 10. Heat sources may range from about 50° C. to about 600° C. or higher. For abandoned oil wells, the temperature range may be in the low temperature range of about 50° C. to about 250° C.

Referring to FIGS. 1-2, the geothermal heat extractor of the present invention preferably further comprises a pump 12 configured to remove liquid from the return conduit 10, a port 14 coupled to a supply source of the heat transfer fluid, an external load 18 in fluid communication with the return conduit 10, a condenser 42, and a controller 32. In the embodiment of FIGS. 1-2, the external load 18 is a heat load.

In particular, the extractor preferably comprises at least one fluid flow control valve 26 to control the supply of heat transfer fluid from the supply conduit 16 to the return conduit 10. This type of valve is referred to herein as a flash flow control valve 26. More preferably, the extractor comprises first and second flash flow control valves 26 to control the supply of heat transfer fluid from the supply conduit 16 to the return conduit 10. The flash flow control valves 26 are provided at spaced-apart positions along the below-grade length of the supply conduit 16. The distribution of the flash flow control valves 26 is preferably selected so as to optimize steam generation.

The heat extractor further preferably comprises a fluid flow control valve 8 positioned between the pump 12 and the return conduit 10 to regulate the flow of liquid being removed from the return conduit 10 by the pump 12. The extractor further preferably comprises a fluid flow control valve 11 positioned between the heat transfer fluid supply port 14 and the heat transfer fluid supply conduit 16 to regulate the flow of the heat transfer fluid from the supply source via the port 14 to the supply conduit 16. The extractor further preferably comprises a third fluid flow control valve 30 positioned between the heat transfer fluid supply conduit 16 and the heat transfer fluid return conduit 10 to regulate the flow of fluid from the return conduit 10 to the supply conduit 16.

The heat transfer fluid is preferably a vaporizable liquid. Preferably, the heat transfer fluid is water, as heat may be conducted to the underground pipes by underground aquifers or by surrounding solid earth around the bore. However, there may be embodiments where other possible working fluids may be used, such as ammonia, fluorocarbons, organic fluids, or the like.

In a first mode, in which the extractor is being prepared for operation, as shown in FIG. 1, the fluid flow control valves 8, 11 are initially open and the fluid flow control valve 30 and the flash flow control valves 26 are closed. In the preparatory configuration of FIG. 1, the pump 12 is activated to remove substantially all liquid present in the heat transfer fluid return conduit 10. Heat transfer fluid is supplied to the heat transfer fluid supply conduit 16. More particularly, in the pre-operational mode of FIG. 1, the fluid flow control valve 8 is initially open and the pump 12 is activated to withdraw liquid from the heat transfer fluid return conduit 10 and to bring the heat transfer fluid return conduit 10 to a pressure that is below the vapor pressure of the heat transfer liquid. The pressure may depend on the working fluid in use. Removed liquid may be discarded. The bore may be empty once drilling is complete and the well is "finished," in which case one may only need to supply liquid to the bore. The heat transfer fluid return conduit 10 is preferably pumped completely or almost completely dry (i.e., completely or almost completely devoid of any liquid). Once the heat transfer fluid return conduit 10 is brought to a low-pressure state, the valve 8 is closed, thereby ensuring that the heat transfer fluid return conduit 10 remains in the low-pressure state. In addition, in the pre-operational mode of FIG. 1, the fluid flow control valve 11 is initially open so that the heat transfer fluid, which is in the liquid state at this stage, can be supplied from the supply source port 14 to the heat transfer fluid supply conduit 16. This may occur before, after, and/or simultaneously with the pumping of the return conduit 10. The fluid flow control valve 11 is closed after the heat transfer fluid supply conduit 16 has been sufficiently filled with the heat transfer fluid in the liquid state such that resulting pressure generated by fluid density under gravitational force may exceed vapor pressure of the higher temperature liquid at the bottom of the bore. Vapor pressure and fluid density may depend on the fluid selected.

FIG. 2 illustrates an embodiment of an operational mode of the geothermal heat extraction system. During operation, the heat transfer fluid is contacted with the heat source in its liquid form and is subsequently flash evaporated through the flow control valves to achieve high levels of heat extraction per unit mass flow, thereby supplying heat to the thermal load 18.

More particularly, referring to FIG. 2, during operation, the fluid flow valves 8, 11 remain closed, and flash flow control valves 26 and fluid flow control valve 30 are open. The open positions of the flash flow control valves 26 enable controlled amounts of the heat transfer fluid to be transferred from the heat transfer fluid supply conduit 16 in liquid form to the heat transfer fluid return conduit 10. Operation of the flash flow control valves 26 is regulated to limit the flow of the heat transfer liquid into the heat transfer fluid return conduit 10, so that the heat transfer fluid return conduit 10 does not become flooded with the heat transfer liquid.

The heat transfer liquid transferred to the vapor return conduit 10 is flash evaporated or flash vaporized by the geothermal heat source 4, which is embodied by the hot earth or liquid surrounding and in intimate contact with the conduit. Vaporization temperature depends on pressure and is a physical property of the heat transfer fluid/liquid. Valve 26 meters liquid into conduit 10 at a rate that is commensurate with the rate at which heat is supplied to conduit 10 to evaporate all the liquid and not allow substantial liquid to accumulate inside conduit 10 so that the steam's pressure will propel the steam up conduit 10.

The heat transfer liquid is preferably supplied to the heat transfer fluid return conduit 10 from the supply conduit 16 via the flash flow control valves 26 at a rate such that continuous vaporization, and more particularly continuous flash vaporization, can be sustained in the return conduit 10, taking into consideration the rate at which heat is supplied to the return conduit 10 by the heat source 4. The heat transfer rate will vary with the geothermal properties of the rock or surrounding liquid around the conduit 10. The latent heat of vaporization is thus extracted from the heat source 4 and may be a physical property of the heat transfer fluid/liquid material selected. The heat of vaporization of the heat transfer liquid is larger than the specific heat of the heat transfer fluid. As such, the geothermal heat extractor is configured to extract high amounts of heat at a given mass flow rate.

The resulting vaporized heat transfer fluid (e.g., steam in the case where the heat transfer fluid is water) travels vertically upwards within the return conduit 10 toward the external load 18. In the embodiment of FIGS. 1-2, where the external load 18 is a heat load, the heat load 18 preferably comprises or is provided with a condenser 42. The vaporized heat transfer fluid condenses at the heat load 18 to release its latent heat without a significant loss of temperature (i.e., under isothermal or near isothermal conditions). That is, the vaporized heat transfer fluid condenses at the heat load 18 to release its latent heat at a temperature that is the same as or almost the same as the temperature of the geothermal heat source. The heat of condensation of the heat transfer fluid is supplied to the heat load 18 for power generation, and the condensed heat transfer fluid is returned to the heat transfer fluid supply conduit 16 via the open fluid flow control valve 30. Heat of condensation is a physical property of the heat transfer fluid used in the system. The system will be sized based on the available heat and the rate to which it would be conducted to conduit 10 by the surrounding earth and liquid (e.g., water).

The use of latent heat as a transport mechanism in this manner provides significantly enhanced performance for geothermal heat extraction and power generation. In one embodiment, the heat transfer fluid is preferably in a saturated state throughout the geothermal heat extraction system, such that the condensation temperature at the heat load 18 is similar to the vaporization temperature down bore.

Alternatively, in another embodiment, depending on the temperature of the heat source 4, the heat conduction rate into the return conduit 10 and the fluid flow rate through the flash flow control valves 26, the vaporized heat transfer fluid reaching the heat load 18 may be superheated. In such a case, the condensation temperature at the heat load 18 is only slightly lower than the down bore vaporization temperature, because of the higher pressure down bore due to the gravitational load of the vapor column within the return conduit 10. The difference in pressure is relatively small because of the relatively low density of the vapor column within the return conduit 10.

As such, in the geothermal heat extraction system according to the present invention, transport of the vaporized heat transfer fluid from the geothermal heat source 4 (i.e., where it is flash vaporized in the return conduit 10) occurs with minimal loss of pressure. Therefore, the vaporized heat transfer fluid releases its latent heat at a temperature that is similar to that of the geothermal heat source 4.

In one embodiment, the geothermal heat extraction system according to the present invention includes a controller 32 and one or more sensors 34. The controller 32 is preferably coupled to each flash flow control valve 26 and each sensor 34. In one embodiment, the controller 32 is also coupled to one or more of the fluid flow control valves 8, 11 and 30. The sensor 34 shown in FIGS. 1-2 monitors the content of the heat transfer fluid return conduit 10 for vapor and liquid. Based on monitoring data received from the sensor 34, the controller actuates the flash flow control valves 26 to (i) place the valves 26 in the open position to permit and regulate flow of the heat transfer liquid into the return conduit 10 at a predetermined rate at which the liquid can be vaporized consistent with the rate at which heat is supplied to the return conduit 10 from the heat source 4, or (ii) place the valves 26 in the closed position to prevent flow of the heat transfer liquid into the return conduit 10 and thus prevent the accumulation of the heat transfer liquid within the return conduit 10.

It will be understood by those skilled in the art that sensors may be utilized in other conduits and locations in the geothermal heat extraction system of the present invention to monitor various parameters of the system and its components. It will also be understood by those skilled in the art that the controller 32 may be coupled to the other flow control valves 8, 11, 30, the port 14, and/or pumps 12, 17 of the system. For example, in one embodiment, the system includes a further sensor in the return conduit 10 to monitor the pressure of the conduit 10, such that when the predetermined low-pressure state is achieved during the pre-operational mode, the controller 32 is triggered to close the fluid flow control valve 8 and/or terminate operation of the pump 12. In one embodiment, the system includes a sensor in the heat transfer fluid supply conduit 16 to monitor the liquid content of the supply conduit 16, such that when the supply conduit 16 is filled to a predetermined level with the heat transfer liquid, the controller 32 is triggered to close the fluid flow control valve 11 and stop the supply of the heat transfer liquid from the port 14. The controller 32 may also be coupled to the fluid flow control valve 30 to move it between the closed and open states, as necessary for the pre-operational and operational modes, respectively.

In one embodiment, the heat transfer fluid conduit 16 may include a pump 17. The pump 17 may assist in increasing the pressure within the heat transfer fluid conduit 16. More particularly, the pump 17 may be coupled to the heat transfer fluid conduit 16 to supply the heat transfer liquid to the flash flow control valves 26 at a pressure above the fluid vapor pressure at the temperature of the heat source 4. As a result, undesirable spontaneous vaporization of liquid in the conduit 16 may be avoided.

Figure 3:
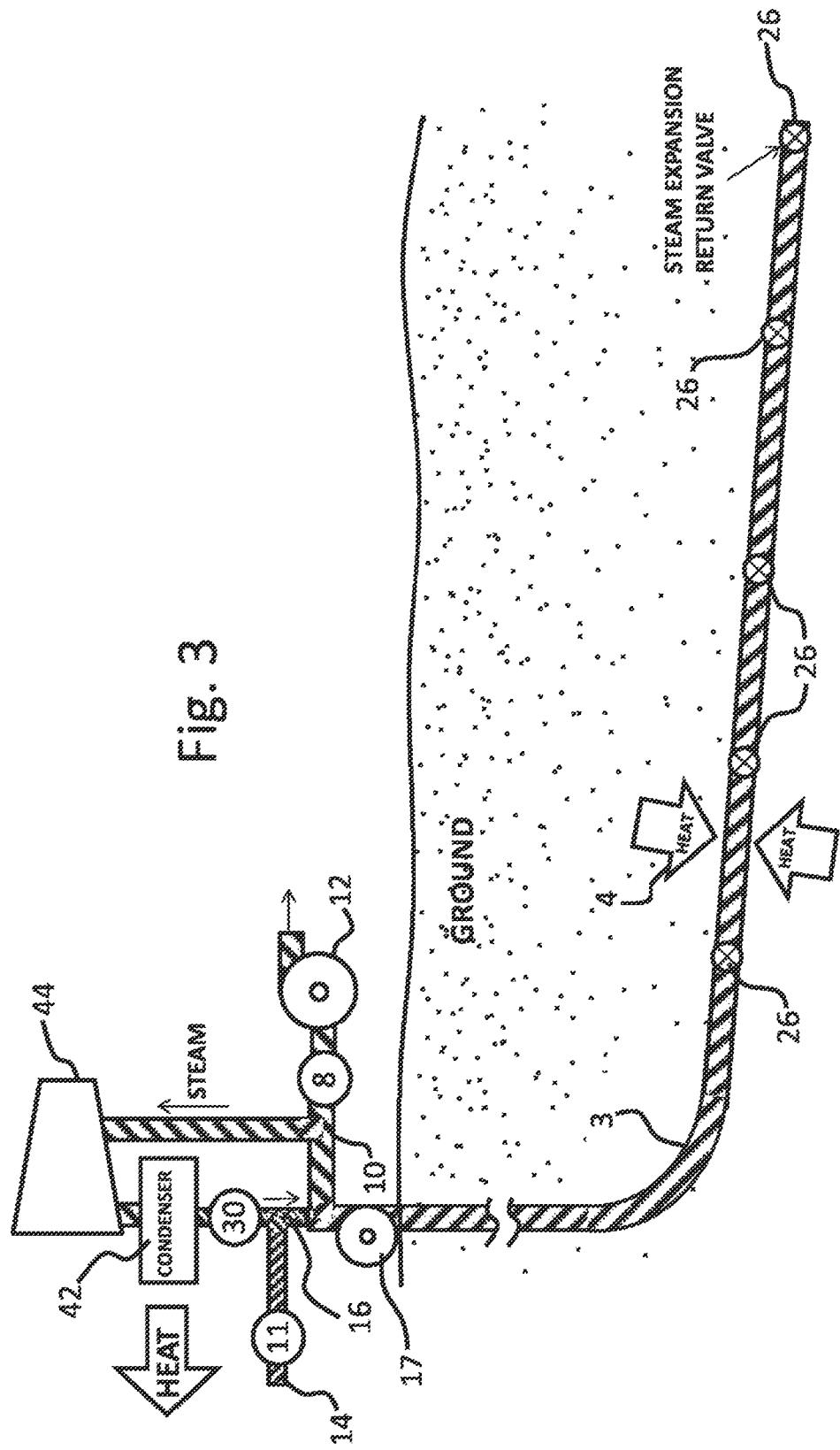
FIG. 3 is a diagram of geothermal heat extraction system in accordance with an embodiment of the invention, using a single bore with distributed flash control valves to generate steam to drive an expansion turbine.

Referring to FIG. 3, there is shown an alternative embodiment of a geothermal heat extraction system according to the present invention. The reference numerals labelling various components of the system which are the same as those of FIGS. 1-2 indicate the same components, and thus a detailed description of such components will not be repeated.

The system of FIG. 3 is particularly configured to be used in a single-bore configuration, for example an abandoned well bore, for heat extraction. In the system of FIG. 3, the heat transfer fluid return conduit 10 and the heat transfer fluid supply conduit 16 are configured in a concentric tube arrangement 3. However, non-concentric arrangements may be used as well. Preferably, the heat transfer fluid supply conduit 16 is arranged as the inner tube and the heat transfer fluid return conduit 10 is arranged as the outer tube. However, it will be understood by those skilled in the art that opposite arrangement of inner and outer tubes may be utilized.

Preferably, both conduits 16, 10 extend into the single bore vertically for a predetermined depth, and then are bent laterally to extend in a lateral or generally horizontal direction for a predetermined distance. The necessary depths/distances may depend on the properties of the heat reservoir. For example, geysers may often me just below the surface, whereas typical oil well bore depths may be between about 5,000 to about 20,000 feet or greater, and horizontal distances at depth can be about 5,000 to about 20,000 feet or greater. Thus, heat is extracted from a heat source 4 at the predetermined depth (i.e., when the conduits 10, 16 are oriented generally horizontally). The concentric tube arrangement 3, and more particularly the heat transfer fluid supply conduit 16, is provided with a plurally of the flash flow control valves 26 at spaced apart positions along the lateral length thereof. The flash flow control valves 26 are preferably distributed at positions consistent with the availability of heat from heat source 4 (i.e., to optimize use of the heat generated by the heat source 4), along the length of the concentric tube arrangement 3 at the predetermined depth, for vapor generation.

In FIG. 3, the geothermal heat extraction system is configured to supply vapor, more particularly steam, to drive a turbine 44. Steam is generated by the operation of the heat transfer fluid conduit 16, heat transfer fluid return conduit 10, heat source 4 and valves 8, 11, 26, 30, as described above with respect to FIGS. 1-2 (i.e., as the heat transfer liquid is transferred from the supply conduit 16 to the return conduit 10, it is flash vaporized therein to generate vapor). The generated steam then travels through the return conduit 10 and is supplied to the expansion turbine 44. Subsequently, the steam enters the condenser 42, and the condensed fluid is then returned through the open fluid flow control valve 30 to the heat transfer fluid supply conduit 16.

Referring to FIGS. 4a and 4b, there are shown views of a concentric tube arrangement 3, for example, which could be used as the concentric tube arrangement 3 in the system of FIG. 3. As shown in FIGS. 4a-4b, the heat transfer fluid supply conduit 16, which is preferably at a relatively high pressure, is arranged as the inner tube and the heat transfer fluid return conduit 10, which is at a relatively low pressure, is arranged as the outer tube. The inner tube 16 includes a plurality of the flash flow control valves 26 distributed along the length thereof in a manner so as to control the release of the liquid heat transfer fluid from the inner tube 16 into the outer tube 10 (i.e., the vapor return conduit 10). As described above with respect to FIGS. 1-3, the heat transfer liquid evaporates once it is introduced into the return conduit 10, as heat is conducted into the vapor return conduit 10 from the geothermal heat source 4.

In one embodiment, the heat extractor may comprise a layer of insulation 28 between the supply conduit 16 and the return conduit 10, for example wrapped around at least a portion of the exterior of the supply conduit 16, in order to limit heat transfer from the vaporized fluid to the liquid phase contained in the supply conduit 16. In one embodiment, the heat extractor may comprise insulation (not shown) along at least a portion of the exterior surface of the return conduit 10, in order to limit heat loss from the vaporized fluid to the lower temperature surroundings in the vertical section of the return conduit 10, as the vapor returns to the surface.

Figure 5:
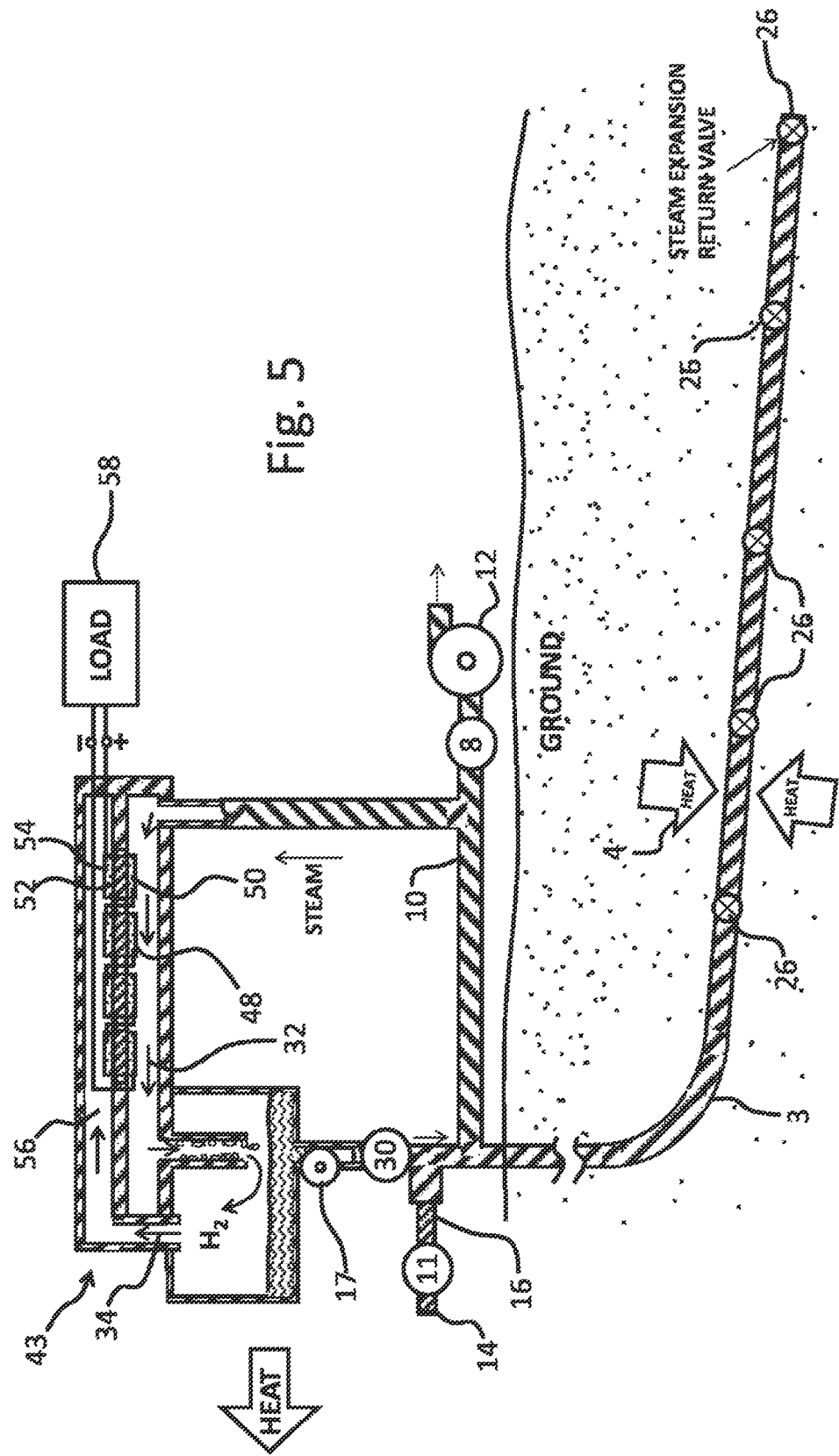
FIG. 5 is a schematic, cross-sectional view of a geothermal heat extraction system in accordance with an embodiment of the invention, in which the external load is a power generating load in the form of an electrochemical heat to electric converter.
Figure 6:
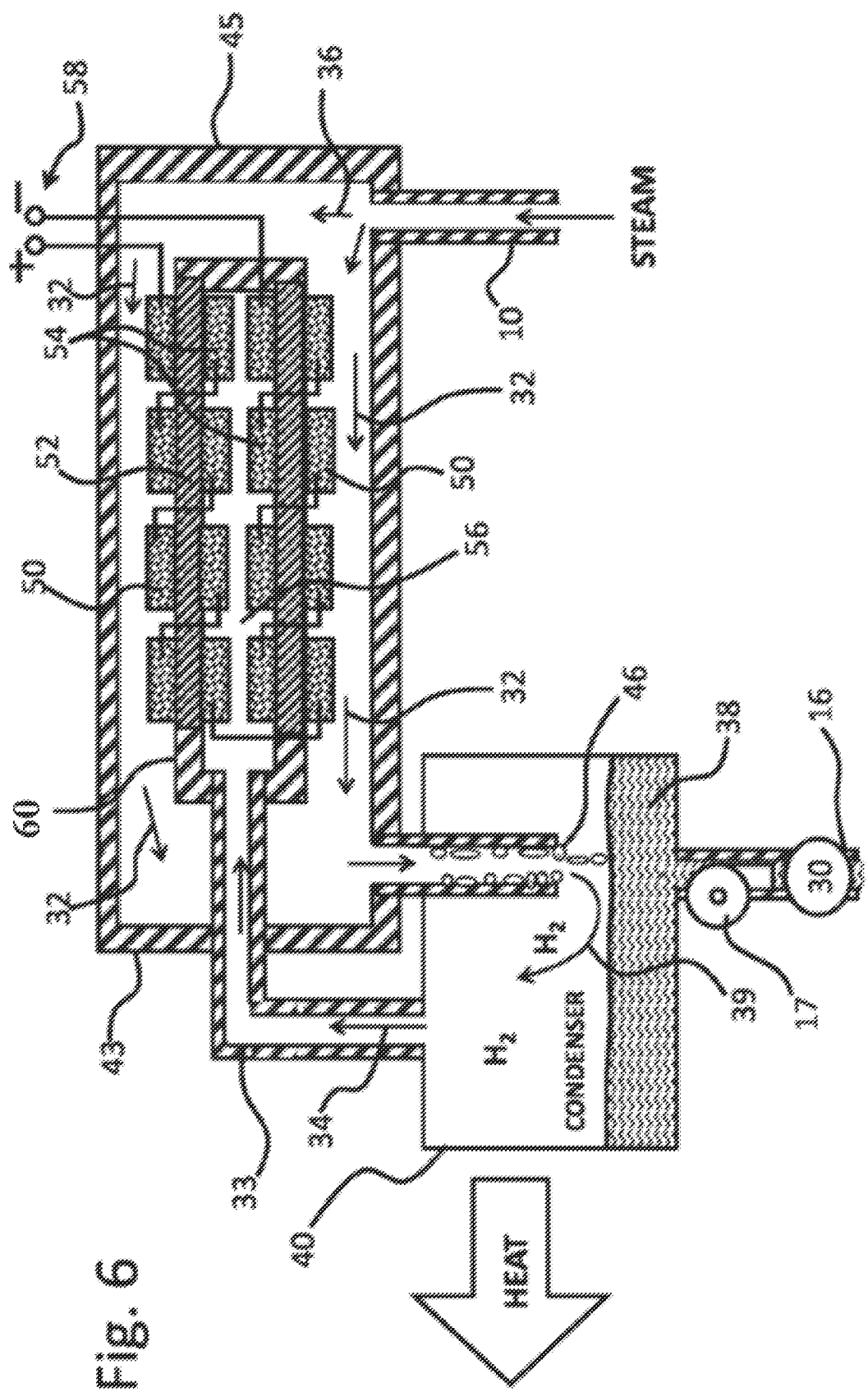
FIG. 6 is a schematic, cross-sectional view of the geothermal heat extraction system shown in FIG. 5 with an enlarged view of the electrochemical heat to electric converter.

Referring to FIG. 5-6, there is shown an embodiment in which the external load is a power generating load. More particularly, in the embodiment of FIGS. 5-6, the power generating load is an electrochemical heat to electric converter 43 and is connected to the geothermal heat extractor according to the present invention, such as the systems of FIGS. 1-4. In the embodiment of FIGS. 5-6, the electrochemical converter 43 is coupled to a geothermal heat extractor of the type shown in FIGS. 3-4. The electrochemical converter 43 is configured to convert energy of the vapor, more particularly steam, generated by the geothermal heat extractor into electricity. In addition to the components of the geothermal heat extractor, as described above, the electrochemical converter 43 comprises a plurality of membrane electrode assemblies 48, and more particularly bipolar membrane electrode assemblies 48, arranged within a housing 45.

The membrane electrode assemblies 48 are electrically connected in series. Each membrane electrode assembly (MEA) 48 comprises a first electrode 50, a second electrode 54, and a proton conductive membrane 52 sandwiched between the electrodes 50, 52. One of the electrodes 50, 54 is a cathode and the other of the electrodes 54, 50 is an anode. Hereinafter, electrode 50 is referred to as the cathode and electrode 54 is referred to as the anode.

In one embodiment, as shown in FIG. 6, the series of MEAs 48 may be coupled by an enclosure 60, a portion of which is formed by the proton conductive membranes 52. The area within the enclosure 60, which comprises the anodes 54 of the MEAs 48, is a first chamber 56, while the area between enclosure 60 and housing 45, which comprises the cathodes 50, is a second chamber 36. The first chamber 56 is referred to herein as a hydrogen chamber or an anode chamber. The second chamber 36 is referred to herein as a working fluid chamber or a cathode chamber.

The electrochemical converter 43 further comprises a gas separation chamber 40, also referred to herein as a condenser, which contains hydrogen and water 38. The electrochemical converter 43 utilizes a working fluid. Preferably, the working fluid is provided from the geothermal heat extractor.

A conduit 33 couples the condenser 40 to the hydrogen chamber 56. The conduit 33 may be a separate component from enclosure 60 and which is coupled to enclosure 60, or the conduit 33 may be an extension of enclosure 60 (i.e., integral with enclosure 60). A first end, or entrance, of the working fluid chamber 36 is coupled to the heat transfer fluid return conduit 10, such that vaporized heat transfer fluid from the return conduit 10 is supplied to the first end of the working fluid chamber 36. A second end, or exit, of the working fluid chamber 36 is coupled to the condenser 40 such that flow of the working fluid 32 is supplied from the working fluid chamber 36 to the condenser 40.

Referring to FIG. 6, the electrochemical converter 43 is shown in an operation mode. During operation, hydrogen 34 from the condenser 40 is supplied to the hydrogen chamber 56, and more particularly to the anodes 54 of the series of MEAs 48, and thereby creates a high partial pressure state or side of the MEAs 48. As the hydrogen 34 passes over the anodes 54, protons are conducted through the proton conductive membranes 52 to the cathodes 50 and electrons are routed to the load 58. Simultaneously, the working fluid 32, more particularly steam, generated by the geothermal heat extractor is supplied from the return conduit 10 of the geothermal heat extractor to the working fluid chamber 36, and more particularly to the cathodes 50 of the series of MEAs 48, and thereby creates a low partial pressure state or side of the MEAs 48. The released protons and electrons are reduced to hydrogen at the low-pressure state within the cathodes 50, and this generated hydrogen is, in turn, released into the working fluid (steam) flow 32.

More particularly, as hydrogen moves across each MEA 48 under the pressure differential, current flows through the external load 58, hydrogen is oxidized within the cathodes 54, and protons pass through the proton conductive membranes 52 to the cathodes 50 and are reduced back to hydrogen as electrons are routed to the cathodes 50 through the load 58. The resulting hydrogen is released into the working fluid chamber 36. Because the working fluid 32, preferably steam, entering the working fluid chamber 36 from the return conduit 10 is substantially free of hydrogen, a hydrogen pressure differential is generated across the MEAs 48. Hydrogen thus expands from the hydrogen chamber 56, which is a high-pressure conduit, into the working fluid chamber 36, which is a low-pressure conduit, as the cathodes 50 extract the heat of expansion from gas flowing in the working fluid chamber 36. In the working fluid chamber 36, the generated hydrogen mixes with the gas flow 32 from the geothermal heat extractor and, thereby, reduces its partial pressure.

The hydrogen pressure differential, in turn, creates a voltage differential across each MEA 48. Hydrogen is oxidized within electrodes 52. The voltage generated by the MEAs 48 is given by the Nernst equation. The voltage is linear with respect to temperature and a logarithmic function of the hydrogen pressure ratio. The voltage is calculated using the Nernst equation (J. H. Hirschenhofer, D. B. Stauffer, R. R. Engleman, and M. G. Klett, Fuel Cell Handbook, Fourth Edition, p. 2-5, 1999):

$$V_{OC} = \frac{RT}{2F} \ln(P_H/P_L)$$

where $V_{OC}$ is the open circuit voltage, R is the universal gas constant, T is the cell temperature, F is Faraday's constant, $P_H$ is the pressure on the high-pressure side and $P_L$ is the pressure on the low-pressure side, and the pressure ratio is $P_H/P_L$.

In one embodiment, the working fluid, and more particularly steam, may be supplied to the working fluid chamber 36 as a superheated vapor or in a saturated state. When in a saturated vapor state, the working fluid gas 32 condenses into liquid or mist 46 in the condenser 40 as its heat of condensation is released to the MEAs 48 under its decreasing partial pressure. The heat of expansion of hydrogen through the MEAs 48 is converted into electricity as the heat of condensation of the steam is consumed. Residual steam is condensed within the gas separation chamber 40 with removal of the remaining heat of condensation. In turn, the working fluid, which is now in a liquid state as water 38, self-separates and is supplied to the heat transfer fluid supply conduit 16 through the fluid flow control valve 30, as hydrogen gas 39 is supplied to the hydrogen chamber 56 as indicated by arrows 34. As described above with respect to FIGS. 1-2, a pump 17 may be included to supply liquid working fluid to the heat transfer liquid supply conduit 16 at an increased pressure.

The series of electrically connected MEAs 48 provides the advantage of maximizing power output compared to a single MEA. Hydrogen increases in partial pressure and, thereby, reduces the pressure ratio across each MEA 48, as it mixes into the gas stream 32 flowing from the entrance of the working fluid chamber 36 (corresponding to the input from the vapor return conduit 10) to the exit of the working fluid chamber 36, which is coupled to the condenser 40. The voltage produced at the first MEAs 48 in the series contacted by the working fluid, where the pressure ratio is highest, will be greater than the voltage of the last MEAs in the series contacted by the working fluid, where the hydrogen partial pressure ratio is lowest. The added voltages of the series connections result in a higher amount of output power for a given amount of hydrogen conduction through the MEAs 48. On the other hand, the voltage generated across a single MEA would result in less overall power generation, because the lower pressure ratio near the exit of the MEA counterbalances the higher pressure ratio entrance the entrance. Energy would be lost as the single electrode conducts electrical current internally under the induced end to end voltage difference. The MEA voltage would be low and based on the average pressure differential of hydrogen as it continuously mixes into the steam flow along the length of a single MEA. In contrast, with a series of electrically connected MEAs 48 as in the present invention, each MEA 48 in the series operates at the mean peak pressure differential occurring at any given point along the series. Further, the change in steam quality as the steam flows across the MEA series with heat extraction and pressure reduction can approximate a near constant temperature condensation power generation process for maximum energy conversion.

Thus, according to the embodiment of FIGS. 5-6, voltages produced under the hydrogen pressure differential at each MEA are added to each other produce a desired voltage output. The vaporized fluid condenses, under near isothermal conditions, as hydrogen generates electricity by consuming the heat of condensation of the working fluid, as the hydrogen expands through each MEA. The plurality of MEA form a series such that the vaporized working fluid passes across the cathodes sequentially, with the working fluid releasing its latent heat of vaporization incrementally and sequentially to each MEA in the series, thus resulting in power generation while approximating a constant temperature condensation process.

The advantageous results which are capable of being achieved with the present invention are discussed below in comparison to results achieved by a conventional system.

As an example of a conventional system, the Chena Hot Springs power plant is one of the world's lowest temperature geothermal plants to date. The Chena plant uses fluid as cool as 164° F. to generate electricity. The Chena plant is often referenced in studies and company proposals, referenced as the benchmark by which future low-temperature geothermal power developments are measured. The heat transfer fluid, particularly water, is supplied from the geothermal source (i.e., the hot springs) at a temperature of 164° F. The temperature of the water is decreased to 130° F., on a sliding slope, as heat is transferred to an organic Rankine engine cycle to generate electricity. Heat is input to the Rankine engine cycle at an average temperature of only 147° F., which has a negative impact on conversion efficiency. The system therefore requires a very high flow rate of the water of 530 gallons per minute to transfer the needed 2.58 $MW_{HEAT}$ of heat to the Rankine engine to produce 210 $kW_e$ of electricity.

In contrast, with the geothermal heat extractor according to the present invention, such as that of FIGS. 1-6, 2.58 $MW_{HEAT}$ of geothermal heat can be generated by flowing steam up a 3,048-meter vertical well bore. Assuming a worst case scenario of constant steam density up the bore, the pressure at the bottom of the bore which would be needed to move the steam up the bore would have to be greater than water pressure. Saturated steam at 164° F. has a density of about 0.25 kg/m³. The required pressure (calculated by p*g*h) would therefore be 0.0075 MPa, (i.e., 0.25 kg/m³*9.8 m/s²*3,048 m). Saturated steam pressure at 164° C. is 0.04 MPa which is thus more than sufficient to push the steam up the well bore. At 164° F., the heat of vaporization of water is 2319 kJ/kg. As such, to return 2.58 $MW_{HEAT}$ to the surface, instead of requiring water flow at 530 gal/min, as required by conventional systems, the present invention would require only 17 gal/min (i.e., 2,580 $kW_{HEAT}$/2,319 kW·sec/kg*60 sec/min*1 gal/3.79 kg). In addition, with the geothermal extractor of the present invention, the heat transfer temperature would be essentially constant, as opposed to being on a sliding slope, which in turn yields additional benefit towards improving overall system efficiency and net power output.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A geothermal heat extractor comprising:
    a heat transfer fluid;
    a heat transfer fluid supply conduit, the heat transfer fluid being maintained in the heat transfer fluid supply conduit in a liquid state at a pressure above its saturation pressure;
    a heat transfer fluid return conduit;
    a geothermal heat source coupled to the heat transfer fluid return conduit;
    at least one flow control valve configured to control the flow of the heat transfer fluid from the heat transfer fluid supply conduit to the heat transfer fluid return conduit to limit the pressure within the heat transfer fluid return conduit below the saturation pressure of fluid vaporized therein; and
    an external load coupled to the heat transfer fluid return conduit,
        wherein as the heat transfer fluid is provided to the heat transfer fluid return conduit in the liquid state, the heat transfer fluid vaporizes in the heat transfer fluid return conduit by heat supplied to the heat transfer fluid return conduit from the geothermal heat source, and
        wherein the vaporized heat transfer fluid is supplied from the heat transfer fluid return conduit to the external load.

2. The geothermal heat extractor according to claim 1, wherein the heat transfer fluid is water.

3. The geothermal heat extractor according to claim 1, wherein the external load is a heat load, and wherein the vaporized heat transfer fluid supplied to the heat load is condensed back to the liquid state, thereby releasing its latent heat of condensation.

4. The geothermal heat extractor according to claim 1, further comprising a liquid phase heat transfer fluid pump coupled to the heat transfer fluid supply conduit and configured to supply the heat transfer fluid to the at least one flow control valve at a pressure above the vapor pressure of the heat transfer fluid at a temperature of the heat source.

5. The geothermal heat extractor according to claim 1, further comprising:
- at least one sensor to monitor a content of the heat transfer fluid return conduit; and
- a controller coupled to the at least one sensor and the at least one flow control valve, the controller being configured to actuate the at least one flow control valve to regulate flow of the heat transfer fluid in the liquid state into the heat transfer fluid return conduit at a predetermined rate, such that the heat transfer fluid in the liquid state is vaporized in the heat transfer fluid return conduit by the heat conducted from the geothermal heat source and such that accumulation of liquid within the heat transfer fluid return conduit is prevented.

6. The geothermal heat extractor according to claim 1, wherein the external load is a power generating load.

7. The geothermal heat extractor according to claim 6, wherein the power generating load is an electrochemical heat to electric converter.

8. The geothermal heat extractor according to claim 7, wherein the electrochemical heat to electric converter comprises:
- a hydrogen chamber;
- a working fluid chamber coupled to the heat transfer fluid return conduit and configured to receive the vaporized heat transfer fluid from the heat transfer fluid return conduit, the vaporized heat transfer fluid being a working fluid which flows through the working fluid chamber;
- a condensation chamber coupled to the hydrogen chamber to supply hydrogen to the hydrogen chamber and coupled to the working fluid chamber to receive working fluid from the working fluid chamber; and
- a plurality of membrane electrode assemblies, each membrane electrode assembly comprising an anode, a cathode and a proton conductive membrane sandwiched between the anode and cathode,
wherein the anodes of the membrane electrode assemblies are positioned in the hydrogen chamber and are exposed to a flow of hydrogen provided from the condensation chamber, and
wherein the cathodes of the membrane electrode assemblies are positioned in the working fluid chamber and are exposed to the working fluid flowing in the working fluid chamber.

9. The geothermal heat extractor according to claim 8, wherein the membrane electrode assemblies are electrically connected in series.

10. The geothermal heat extractor according to claim 8, wherein the vaporized heat transfer fluid condenses in the condensation chamber under isothermal or nearly isothermal conditions.

11. The geothermal heat extractor according to claim 9, wherein the working fluid passes across the cathodes of the membrane electrode assemblies sequentially, the working fluid releasing its latent heat of vaporization incrementally and sequentially to each membrane electrode assembly, thereby generating power while approximating constant or nearly constant temperature condensation of the working fluid.

* * * * *